United States Patent Office 3,402,795
Patented Sept. 24, 1968

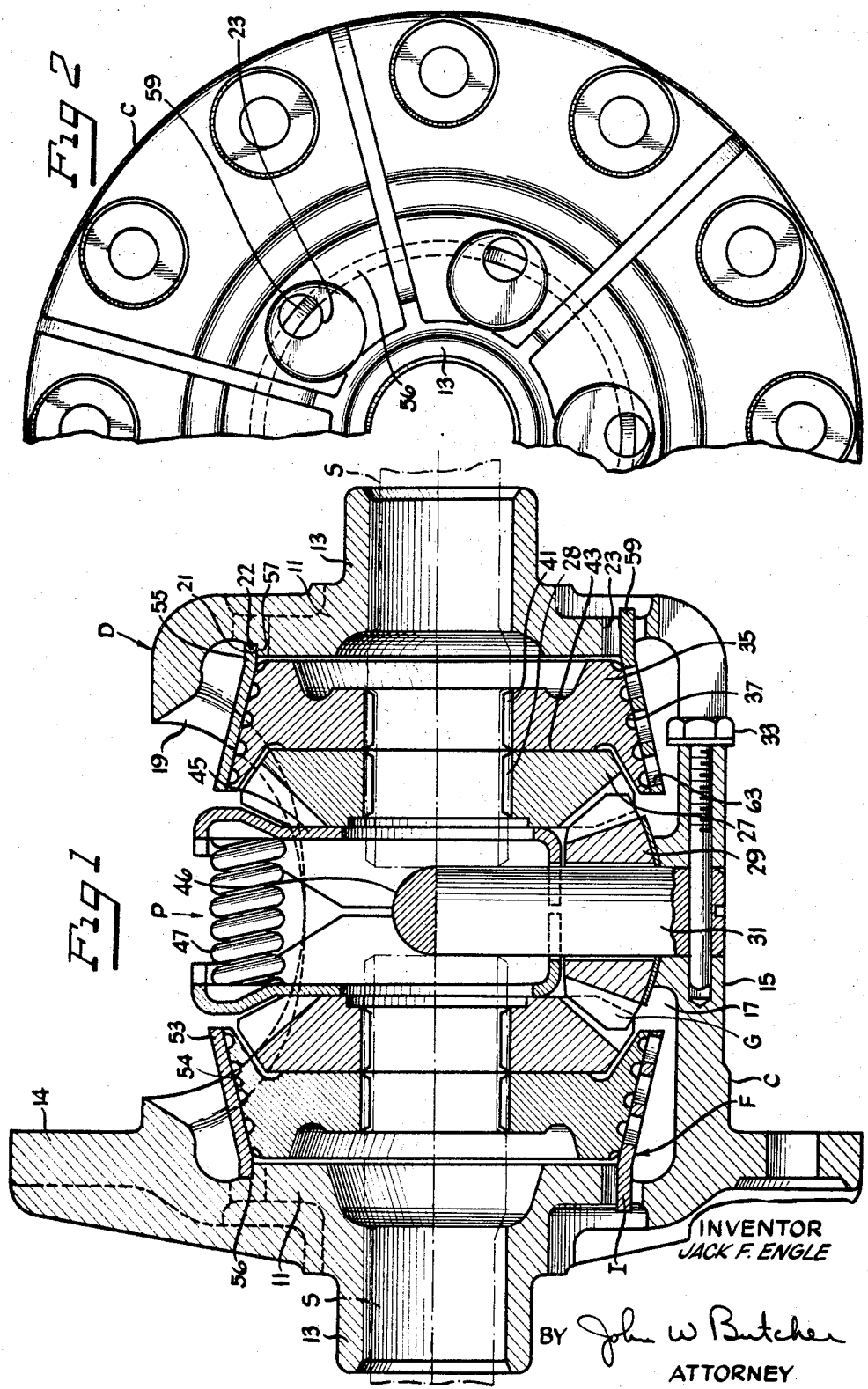

3,402,795
DIFFERENTIAL MECHANISM
Jack F. Engle, Auburn, Ind., assignor to Borg-Warner Corporation, Chicago, Ill., a corporation of Illinois
Original application July 29, 1965, Ser. No. 475,810, now Patent No. 3,327,559, dated June 27, 1967. Divided and this application May 10, 1967, Ser. No. 655,688
3 Claims. (Cl. 192—107)

ABSTRACT OF THE DISCLOSURE

An insert for a limited slip differential mechanism defining a conical clutch member seating surface including an axially extending generally cylindrical flange disposed adjacent the convergent end of said conical seat surface extending laterally in a direction away from said seat surface. Said flange includes a generally cylindrical pilot surface radially positioning said insert within a differential mechanism casing and terminating at an end opposite said conical seating surface in a radially directed annular ring axially positioning said insert within said mechanism.

---

The present invention is a divisional application of Ser. No. 475,810, Now Pat. No. 3,327,559 filed July 29, 1965, entitled Differential Mechanism.

This invention relates to limited slip differential mechanisms which provided a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is a further object of the present invention to provide an improved form of limited slip differential mechanism utilizing conically shaped clutches to resist differentiation wherein the machining of conically shaped cone seat surfaces on the interior of the mechanism casing is eliminated.

It is another object of the present invention to provide an improved form of limited slip differential mechanism of the type described which includes separate removable inserts which form the conically shaped cone seat surfaces.

It is another object of the present invention to provide a removable cone seat insert for a limited slip differential mechanism.

These and other objects of the present invention will become apparent with reference to the following description and the accompanying drawings.

In the drawings:

FIGURE 1 is a revolved cross-sectional elavtional view of a differential mechanism constructed in accordance with the present invention showing various of the features thereof:

FIGURE 2 is an end view of the differential mechanism of FIGURE 1 showing in greater detail certain particular features of the invention.

Very generally, a differential mechanism D includes a casing C surrounding adjacent ends of a pair of coaxially aligned relatively rotatable output shafts S. The casing C is adapted to receive input torgue from a drive line system (not shown). A bevel gear system generally designated G is connected between the casing C and the shafts S and transmits rotational effort to the shafts while simultaneously allowing relative rotation between them when required, as when an automative vehicle negotiates a corner.

A pair of friction clutches F provide the desired resistance to differential action. Each clutch includes a friction surface associated with the casing C and a friction surface associated with one of the output shafts S. Frictional engagement of these surfaces provides a direct path for transmission of rotation effort from the casing to the output shafts independent the bevel gear system G. The clutches, thus, overcome the inherent ability of the mechanism to allow differentiation between shafts and torque is transmitted to both shafts even though they may experience unequal loading. Of course, one such clutch associated with one of the output shafts S could be used.

The friction surfaces of the clutch F are maintained in engagement by a spring pack P which provides an intial preload to insure that at least a predetermined minimum resistance to differential action exists.

Each of the clutches F includes a removable insert I which is connected to the casing C for rotaton therewith and which forms the friction surface of the clutch F associated with the casing C.

More specifically, and as best seen in FIGURE 1, the differential casing C is integrally formed as by casting and may be constructed of any suitable material such as, for example, malleable iron.

The casing C includes a pair of spaced apart, generally parallel transverse walls 11 each of which includes a longitudinally elongated hub 13 adapted to receive one of the output shafts S. The hubs do not form journals for the shafts S, but rather support bearings (not shown) which position the mechanism D within the axle assembly.

One of the transverse walls 11 is provided with a radially directed flange 14 to which is secured a ring gear (not shown) adapted to receive input torque from the associated drive line system.

The transverse walls are connected by a longitudinally extending, generally cylindrical wall 15 which defines, with the walls 11, an internal cavity 17 surrounding the adjacent ends of the output shafts.

The cylindrical wall 15 is provided with a side port 19 defining a relatively large access opening for assembly purposes. The side port additionally allows lubricant to enter the cavity for lubrication of both the bevel gear system G and the clutches F.

The interior surface of each of the transverse walls 11 is provided with a generally cylindrical pilot surface or shoulder 21 disposed coaxially of the longitudinal axis of the shafts S and the hubs 13. The side wall 11 extends radially outwardly from the shoulder 21 to form an axial stop surface 22. The shoulder 21 and axial stop surface 22 act to position the insert I within the cavity 17 as will be explained.

A plurality of longitudinally directed end ports 23 in the form of drilled holes are provided in each transverse wall. These ports are disposed generally perpendicularly to the axial stop surface 22 and are spaced about a base circle having a diameter approximately equal to the diameter of the cylindrical shoulder 21. This diameter may vary slightly as will become apparent.

Referring now to the bevel gear system G, best seen in FIGURE 1, there is provided an arrangement which transmits output torque to the shafts S and simultaneously allows relative rotation between shafts when necessary, as when a vehicle is cornering.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined as at 28.

The side gears are in constant mesh with a pair of pinion gears 29 supported by a transversely extending pinion pin 31, disposed intermediate the adjacent ends of the shaft S and secured to the casing C for rotation therewith by retainer pin 33.

As can be appreciated, rotation of the differential casing C by the drive line system causes the pinion pin 31 to revolve about the centerline of the shafts S. The pinion gears 29, therefore, transcribe a generally cylindrical path about the axis of the shafts, and as they are in mesh with the side gears 27, the side gears are caused to rotate and thereby transmit torsional effort to the output shafts S.

If one of the output shafts is required to rotate at a different speed than the other, as when cornering, the pinion gears 29 not only revolve about the longitudinal axis of the output shafts, but also rotate about the pinion pin 31 allowing relative movement between the side gears 27. Consequently, the output shafts S rotate relative to each other as well as relative to the casing C.

Differentation, i.e., relative rotation between the shafts, inherently possible by virtue of the above described structure, is resisted by the engagement of the friction surfaces of the clutches F. Each of these clutches includes a frustoconical clutch member 35 and one of the cone seat inserts I frictionally engaged by the member 35 along a complementary conical surface.

A spirally progressing groove 37 is provided in the conical surface of the clutch member 35 for distribution of oil or other lubricant to the frictionally engaged surfaces.

Each clutch member 35 includes an internally splined bore 41 connected to one of the shafts S and is, therefore, rotatable with the shaft and axially movable thereon. Each of the clutch members 35 is disposed between one of the transverse walls 11 of the casing C and one of the side gears 27. The respective side gear 27 and the clutch member 35 of each shaft S are in radial contact along the surface 43 and movement of either of these members toward the other, therefore, causes a corresponding movement of the other element in the same direction.

Application of axial force upon the side gears and consequently upon the clutch members 35 is accomplished in two ways; first, initial frictional engagement of the clutch members 35 with the drum or seat surface of the inserts I is provided by the spring pack P. The spring pack generally surrounds the transverse pinion pin 31 and includes a pair of gear contacting members 45, each of which is in contact with one of the side gears 27 adjacent the pinion pin. Each of the gear contacting members includes axially extending flanges having openings 46 to provide clearance for the pinion pin 31. A plurality of compressed coil springs 47 extend longitudinally between the contacting members 45 and urge them axially outwardly. This axial loading is transmitted to the side gears which are axially movable on the shafts S. The side gears, in turn, transmit the axial force to the clutch members 35, which are also splined to the shafts S and consequently are free to move axially into frictional engagement with the conical friction surface on the insert I.

Secondly, the initial frictional engagement of the clutch member 35 with the insert I, provided by the spring pack P, is increased, generally as a function of the torsional input to the mechanism casing C by the bevel gear system G.

Application of torque to the mechanism creates axial separating forces upon the side gears 27 which forces are, in turn, transferred to the clutch members 35 to provide a cumulative increased frictional engagement of the clutches with the conical inserts I to resist differentiation.

In accordance with the present invention, as best seen in FIGURE 1, the conical drum or seat surfaces frictionally engaged by the clutch members 35 are provided by the removable cone seat inserts I which form the friction surfaces of the clutches F associated with the casing C. These inserts include a generally conically shaped wall portion 53, the interior of which includes a conical seat surface 54 engaged by the clutch member 35. The inserts I may be formed of any suitable material such as, for example, steel, and may be made by any one of several manufacturing processes such as stamping, turning, spinning, grinding, etc. They may also be made from tubular sections appropriately formed to the required configuration.

The convergent end of the conical wall 53 of each insert is provided with an axially extending generally cylindrical flange 55 forming a generally cylindrical pilot surface 57 having an inner diameter equal to the diameter of the pilot shoulder 21, of the casing C. The insert is disposed within the differential casing with the pilot surface 57 overlying the shoulder 21 formed on the casing wall 11 to effect radial location of the insert with respect to the output shafts S and accordingly with respect to the clutch members 35.

Further, the outer surface of the radial flange 55 of each insert defines a radially directed annular ring 56 which is disposed in contact with one of the axial stop surfaces 22 to axially position the insert I with respect to the casing C and the clutch members 35. These stop surfaces fix the position of the inserts in relation to the clutch members and support them in opposition to the axial forces applied by the spring pack P and side gears 27 upon torque application, to effect the frictional engagement between the surfaces 54 and clutch members 35.

As can readily be appreciated, the inserts I must, of necessity, be retained in relatively stationary relationship with respect to the casing C in order to transmit rotational effort from the casing to the clutch member 35 for purposes of resisting differentation. To this end, a plurality of drive tabs 59 extending axially outwardly from the ring 56 are provided which are sized and spaced apart so as to be retained within the end ports 23. A driving relationship between the inserts I and the casing C is thus established enabling the transmission of rotational effort from the casing C to the clutch member 35 through the frictional engagement of the clutch members 35 with the conical seat surface 54. The number of axial drive tabs may, of course, be varied in accordance with the design characteristics of a particular differential mechanism.

As previously stated, the base circle diameter upon which the end port openings are disposed should be approximately equal to the diameter of the shoulder 21 of the casing C. With this arrangement the diameter of the end port holes must be such as to accommodate the insertion of the tabs 59 to establish driving engagement between the casing C and the inserts I.

Alternatively, the base circle size could be made equal to the diameter of the shoulder 21 plus one-half the thickness of the tab 59. With this arrangement the tab would generally bisect the end port opening with the mid-point of the tab being disposed generally at the center of the end port hole.

A further modification of the structure is possible using generally the arrangement just described. The dimensional precision of the diameters of the end ports 23 and the circumferential width of the drive tabs 59 may be controlled to the extent that a closely fit engagement of the tabs with the end ports is effected. The drive tabs, therefore, would not only provide engagement between the insert I and the casing C, but would also radially position the insert within the casing. In this embodiment the shoulder 21 of the casing C and the axially extending flange 55 of the insert I could be eliminated. The conical wall 53 would terminate in an annular ring 56 at its convergent end which would abut against the stop surface 22 to axially position the insert.

Each of these variations, of course, are within the contemplated scope of the invention.

Each insert I is provided with a plurality of lubricating orifices 63 to supply lubricant to the spirally progressing groove 37 of the clutch member 35. These orifices are disposed longitudinally along the insert conical wall 53 in one or more rows as desired. Lubricant within the cavity 17 of the casing C may pass through these orifices into communication with the spiral grooves 37 for distribution to the frictionally engaged surfaces. Other forms of lubricant distribution facilities could also be used without departing from the scope of the invention.

In assembling the mechanism, each of the inserts I is first placed in overlying relation to a clutch member 35. These components are then inserted through the side port opening 19 and positioned such that the cylindrical pilot surfaces 57 of the insert properly engage the shoulders 21 of the casing and the radially directed rings 56 contact the axial stop surfaces 22 with the tabs 59 disposed in the end port openings 23. The side gears 27 are then placed in contacting relation with the clutch members 35 along the surfaces 43. Alternatively, the side gears and clutch members 35 could be integrally formed.

The pinion gears are then positioned in mesh with the side gears in 180° opposed facing relation, and the bevel gear system is rotated to align the pinion gears with respect to the casing C for insertion of the pinion pin 31. The spring pack P is then compressed and installed through the side port opening with the gear contacting members engaging the side gears. The gear contacting members of the spring pack must be aligned so that the openings 46 are disposed for insertion of the pinion pin. The pin is then inserted through the pinion gears and spring pack and locked to the casing C with the retainer screw 33 to complete the assembly of the device.

It is readily apparent that, in the above described embodiment, complex machining of the interior wall surface of the casing C has been eliminated. The insert I is positioned and retained by the easily formed axially extending flange 55 provided with the cylindrical pilot surfaces 57 and radially directed annular rings 56 which engage the simply formed shoulders 21 and axial stop surfaces 22. Driving engagement of the insert I with the casing C, which is essential to proper operation of the mechanism, is provided by engagement of the drive tabs 59 with the end ports 23 of the casing. Each of these elements may readily be formed upon the respective component of the mechanism by simple manufacturing processes.

Other significant advantages of the structure described are also readily apparent. Various of the features of the invention have been particularly shown and described, however, it should be obvious to one skilled in the art that various modifications may be made therein without departing from the scope of the invention.

What is claimed is:

1. An insert for a limited slip differential mechanism comprising: means defining a generally conical seat surface for engagement by a conical clutch member; an axially extending generally cylindrical flange disposed adjacent the convergent end of said conical seat surface extending laterally in a direction away from said seat surface, said flange defining a generally cylindrical pilot surface to radially position said insert; said flange terminating at an end opposite said conical surface in a radially directed annular ring to axially position said insert.

2. An insert for a limited slip differential mechanism comprising: means defining a generally conical seat surface for engagement by a conical clutch member; an axially extending generally cylindrical flange disposed adjacent the convergent end of said conical seat surface extending laterally in a direction away from said seat surface, said flange defining a generally cylindrical pilot surface to radially position said insert; said flange terminating at an end opposite said conical surface in a radially directed annular ring to axially position said insert; and at least one drive tab extending axially outwardly of said annular ring to provide driving engagement.

3. An insert for a limited slip differential mechanism comprising: a generally conical wall defining a conical seat surface for engagement by a conical clutch member, said conical wall terminating at its convergent end in a radially directed annular ring to axially position said insert and a plurality of drive tabs extending axially outwardly of said annular ring disposed thereabout in circumferentially spaced apart relation to provide driving engagement and to radially position said insert.

References Cited

UNITED STATES PATENTS

| 1,141,648 | 6/1915 | Mitchella | 192—107 X |
| 2,395,189 | 2/1946 | Lapsley et al. | 192—107 |
| 2,965,205 | 12/1960 | Winchell | 192—66 |

ARTHUR T. McKEON, *Primary Examiner.*